Figure 1:
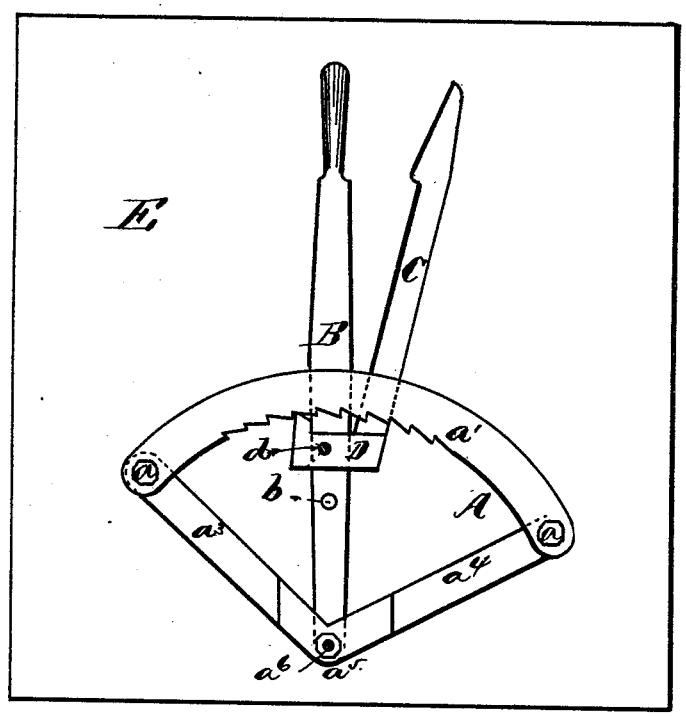
Figure 1:
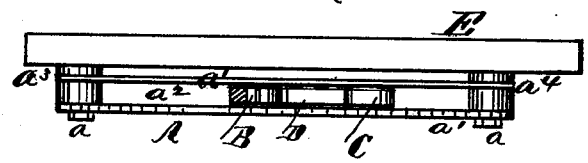

E. ENGLE & H. K. SNAVELY.
WAGON-BRAKE LEVER.

No. 182,910.   Patented Oct. 3, 1876.

Fig. II.

Witnesses:
Franklin Barritt.
Richard Gerner.

Inventors:
Edward Engle.
Henry K. Snavely.
Per: Alexander & Mason
Attys.

UNITED STATES PATENT OFFICE.

EDWARD ENGLE AND HENRY K. SNAVELY, OF MUSCATINE, IOWA.

IMPROVEMENT IN WAGON-BRAKE LEVERS.

Specification forming part of Letters Patent No. 182,910, dated October 3, 1876; application filed November 30, 1875.

*To all whom it may concern:*

Be it known that we, EDWARD ENGLE and HENRY K. SNAVELY, both of the city and county of Muscatine, and State of Iowa, have invented a new and useful Improvement in Wagon-Brakes, of which the following is a full and clear description.

This invention has for its object the application of a self-locking lever to the brake-rod of a wagon, so as to enable the driver to lock the brake by the simple movement of the lever that applies the brake.

The invention consists of a solid iron frame, which is secured to the side of the wagon-bed, and on which is provided a segmental serrated rack, into which a pawl catches as the lever to which it is attached moves forward. A secondary lever is provided for unlocking the pawl.

The invention will be readily understood by reference to the accompanying drawings, of which—

Figure I is a side elevation of the improved brake attachments affixed to a section of the side of a wagon-bed. Fig. II is a plan of the same.

The frame A is cast in one solid piece, and is bolted to the side of the wagon-bed E by the bolts $a$. This frame consists of two segmental top pieces, $a^1$, between which is formed a mortise or slot, $a^2$, (shown in Fig. II,) and two radial arms, $a^3$ $a^4$, which connect the ends of the top pieces with a central part or hub, $a^5$, to which the lever B is fulcrumed by the pin $a^6$. The lever B, being fulcrumed as above described, passes thence up through the mortise or slot $a^2$, and its top end is finished off in the form of a hand-piece, which is placed within easy reaching distance of the driver, who is to operate it. A hole, $b$, through this lever is intended to receive the coupling-pin that is to connect the brake-rod with it. The pawl D is pivoted to the lever B by the pin $d$, and is arranged to engage the teeth of the serrated rack on the bottom sides of the twin rack-plates $a^1$. The lever C is placed in front of and nearly parallel with the lever B, and its lower end is fixed to the pawl-piece D by one or more pins or bolts, or otherwise, while its top is on a line with the top end of the lever B.

When in use the weight of the lever C will habitually throw the pawl into contact with the serrated rack on $a^1$, and when the lever is thrown forward, so as to apply the brake, the pawl will follow up the movement and secure the lever in any position required; but when the lever is to be released the driver will grasp the ends of both levers and press them together, and this action will release the pawl from its rack and leave the levers free to be moved in either direction, as required.

Having thus described our invention, we desire to claim—

The within-described device for operating a wagon-brake, consisting of the bars $a^3$ $a^4$, the rack-bars $a^1$ $a^1$, connected to each end of the top of the same, the upright lever B, pivoted to the hub and passing between the rack-bars, the lever $c$ having a pawl, D, at its lower end which is pivoted near its front end to the lever B, constructed and used as and for the purposes set forth.

EDWARD ENGLE.
HENRY K. SNAVELY.

Witnesses:
THOMAS HANNA,
GEO. CLAPP.